(12) United States Patent
Fox et al.

(10) Patent No.: US 8,023,952 B2
(45) Date of Patent: Sep. 20, 2011

(54) LOCATION UPDATING IN COMMUNICATIONS NETWORKS

(75) Inventors: David Andrew Fox, Reading (GB); Gavin Wong, Surrey (GB); Christopher David Pudney, Newbury (GB)

(73) Assignee: Vodafone Group PLC, Berkshire (GB)

( * ) Notice: Subject to any disclaimer, the term of this patent is extended or adjusted under 35 U.S.C. 154(b) by 0 days.

(21) Appl. No.: 11/180,872

(22) Filed: Jul. 13, 2005

(65) Prior Publication Data

US 2006/0068784 A1    Mar. 30, 2006

(30) Foreign Application Priority Data

Jul. 14, 2004  (GB) .................................. 0415754.1

(51) Int. Cl.
*H04Q 7/20* (2006.01)
(52) U.S. Cl. .................. 455/444; 455/552.1; 455/556.1; 455/560; 455/456.1; 455/436; 370/338
(58) Field of Classification Search .............. 455/426.1, 455/432.1, 436, 456.1, 444, 560, 443, 440, 455/553.1, 552.1, 556.1; 370/338, 328
See application file for complete search history.

(56) References Cited

U.S. PATENT DOCUMENTS

| | | | |
|---|---|---|---|
| 6,741,693 B1 | 5/2004 | Madoch et al. | |
| 7,224,976 B2* | 5/2007 | Artamo et al. | 455/450 |
| 2001/0046218 A1* | 11/2001 | Costa et al. | 370/331 |
| 2002/0147008 A1* | 10/2002 | Kallio | 455/426 |
| 2003/0050076 A1* | 3/2003 | Watanabe | 455/456 |
| 2004/0047323 A1* | 3/2004 | Park et al. | 370/338 |
| 2004/0058692 A1 | 3/2004 | Kall et al. | |
| 2004/0105434 A1 | 6/2004 | Baw | |
| 2004/0116120 A1 | 6/2004 | Gallagher et al. | |
| 2004/0121781 A1* | 6/2004 | Sammarco | 455/456.1 |
| 2004/0203789 A1* | 10/2004 | Hammond et al. | 455/440 |
| 2005/0233729 A1* | 10/2005 | Stojanovski et al. | 455/411 |

(Continued)

FOREIGN PATENT DOCUMENTS

EP    1 207 708 A1    5/2002

(Continued)

OTHER PUBLICATIONS

Salkintzis, Apostolis K., Institute of Electrical and Electronics Engineers: "*Interworking Between WLANs and Third-Generation Cellular Data Networks*," VTC 2003-Spring. The 57th IEEE Semiannual Vehicular Technology Conference New York, NY, vol. 3 of 4, Conf. 57, Apr. 22, 2003, pp. 1802-1806.

*Primary Examiner* — Patrick N Edouard
*Assistant Examiner* — Fred A Casca
(74) *Attorney, Agent, or Firm* — Workman Nydegger

(57) ABSTRACT

This disclosure concerns methods and systems for network communications. In one example of such a method, respective groups of cells are first allocated to respective location regions. Next, respective indicators are received from various devices, indicating the identity of the cell occupied by the corresponding device. Additionally, a database is maintained that includes information concerning the location region occupied by each device. In operation, when a device switches from a radio access network to another access network, the other access network receives the indicator of the identity of the cell occupied by the device and, in dependence thereon, selects the location region which the device is deemed to occupy by a core network.

31 Claims, 2 Drawing Sheets

U.S. PATENT DOCUMENTS

2005/0249171 A1 * 11/2005 Buckley et al. ............... 370/338

FOREIGN PATENT DOCUMENTS

| | | | |
|---|---|---|---|
| EP | 1 301 052 | A3 | 4/2003 |
| GB | 2 367 213 | A | 3/2002 |
| GB | 2 376 845 | A | 12/2002 |
| GB | 2 387 069 | A | 10/2003 |
| WO | WO 03/032618 | A1 | 4/2003 |
| WO | WO 03/032656 | A1 | 4/2003 |
| WO | WO 03/096628 | A1 | 11/2003 |
| WO | WO 03/098959 | A1 | 11/2003 |
| WO | WO 2004/002051 | A3 | 12/2003 |

* cited by examiner

LOCATION UPDATING IN COMMUNICATIONS NETWORKS

CROSS-REFERENCE TO RELATED APPLICATIONS

This Application claims the benefit of United Kingdom Patent Application No: GB 0415754.1 entitled LOCATION UPDATING IN COMMUNICATIONS NETWORKS, filed Jul. 14, 2004, which is incorporated herein in its entirety by this reference.

BACKGROUND OF THE INVENTION

The Field of the Invention

The present invention relates to location up-dating in communications networks.

BRIEF SUMMARY OF EXEMPLARY EMBODIMENTS OF THE INVENTION

According to a first aspect of the invention, there is provided a GSM or the like cellular telecommunications network including a radio access network and a core network for providing GSM or the like functions to devices registered therewith over a GSM or the like bearer; wherein the radio access network comprises a plurality of geographically distributed cells, the devices provide to the radio access network an indicator of the identity of the cell occupied thereby, respective groups of said cells are allocated to respective location regions by the core network, and the core network maintains a database of the location region occupied by each device; the network being adapted to provide core network GSM or the like functions to devices registered therewith over a non-GSM bearer via another access network, and wherein, when a device switches from the radio access network to the other access network, the other access network receives the indicator of the identity of the cell occupied by the device and in dependence thereon selects the location region which the device is deemed to occupy by the core network.

According to a second aspect of the invention, there is provided a method of operating a GSM or the like cellular telecommunications network including a radio access network and a core network for providing GSM or the like functions to devices registered therewith over a GSM or the like bearer, the radio access network comprising a plurality of geographically distributed cells, the method including allocating respective groups of said cells to respective location regions, receiving from said devices radio an indicator of the identity of the cell occupied thereby, and maintaining a database of the location region occupied by each device; the network further providing core network GSM or the like functions to devices registered therewith over a non-GSM bearer via another access network, and the method further including, when a device switches from the radio access network to the other access network, receiving the indicator of the identity of the cell occupied by the device and in dependence thereon selecting the location region which the device is deemed to occupy by the core network.

These and other aspects of exemplary embodiments of the present invention will become more fully apparent from the following description and appended claims.

BRIEF DESCRIPTION OF THE DRAWINGS

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

Figure 1:
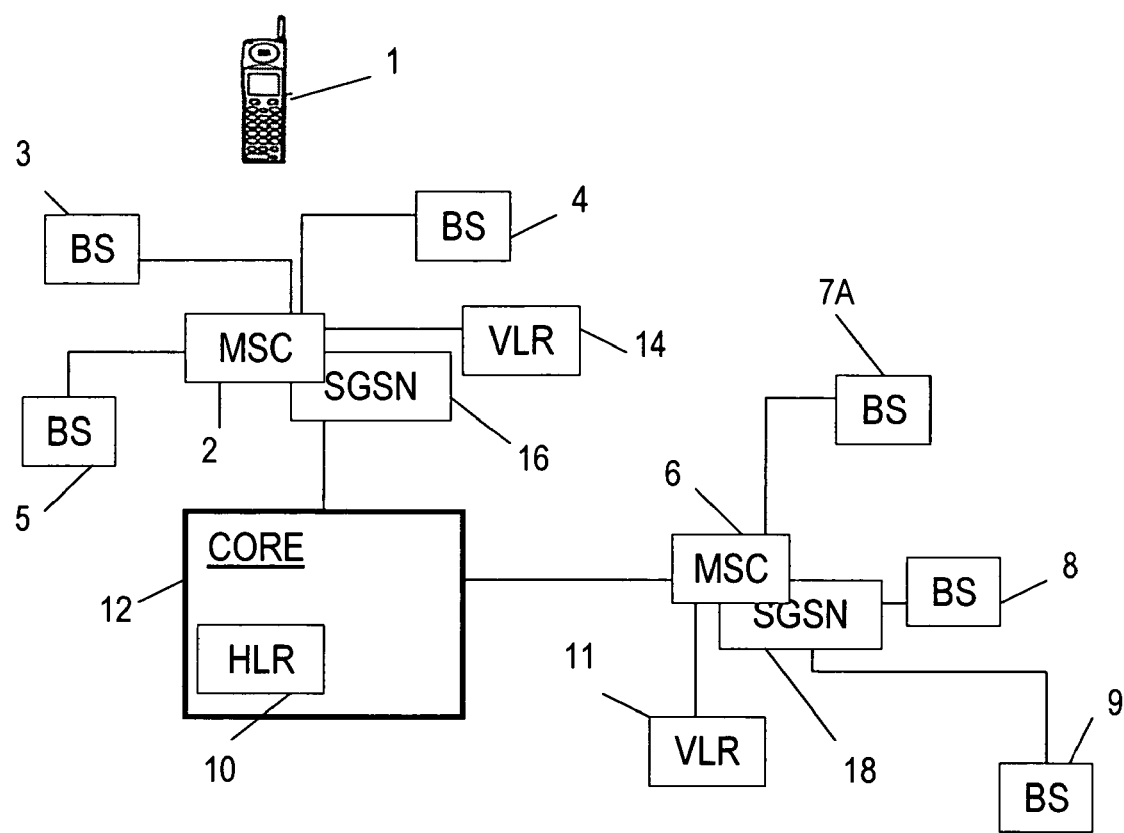
FIG. 1 is a diagrammatic drawing of key elements of a GSM mobile telephone network for use in explaining the operation of such a network.

Various elements of a mobile telecommunications network, and its operation, will now briefly be described with reference to FIG. 1.

Each base station (BS) corresponds to a respective cell of its telecommunications network and receives calls from and transmits calls to a mobile terminal in that cell by wireless radio communication. Such a subscriber's mobile terminal is shown at 1. Each base station comprises a base transceiver station (BTS) and a base station controller (BSC). A BSC may control more than one BTS.

The base stations are arranged in groups and each group of base stations is controlled by a mobile switching centre (MSC), such as MSC 2 for base stations 3, 4 and 5. As shown in FIG. 1, the network has another MSC 6, which is controlling a further three base stations 7, 8 and 9. In practice, the network will incorporate many more MSCs and base stations than shown in FIG. 1.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) which is not visible on the card and is not known to the subscriber. The subscriber is issued with a publicly known number, that is, the subscriber's telephone number, by means of which calls to the subscriber are initiated by callers. This number is the MSISDN.

The network includes a home location register (HLR) 10 which, for each subscriber to the network, stores the IMSI and the corresponding MSISDN together with other subscriber data.

When the subscriber wishes to activate their mobile terminal in a network (so that it may make or receive calls subsequently), the subscriber places their SIM card in a card reader associated with the mobile terminal (terminal 1 in this example). The mobile terminal 1 then transmits the IMSI (read from the card) to the base station 3 associated with the particular cell in which the terminal 1 is located. The base station 3 then transmits this IMSI to the MSC 2 with which the BS 3 is registered.

MSC 2 now accesses the appropriate location in the HLR 10 present in the network core 12 and extracts the corresponding subscriber MSISDN and other subscriber data from the appropriate storage location, and stores it temporarily in a location in a visitor location register (VLR) 14. In this way, therefore the particular subscriber is effectively registered with a particular MSC (MSC 2), and the subscriber's information is temporarily stored in the VLR (VLR 14) associated with that MSC.

Each of the MSCs of the network (MSC 2 and MSC 6) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a call, having already inserted the SIM card into the reader associated with this mobile terminal in the manner described, a call may be made by entering the telephone number of the called party in the usual way. This information is received by the base station 3 and is then routed to the called party via the MSC 2. By means of the information held in the VLR 14, MSC 6 can associate the call with a particular subscriber and thus record information for charging purposes.

The MSCs 2 and 6 support communications in the circuit switched domain—typically voice calls. Corresponding serving gateway support nodes (SGSNs) 16 and 18 are provided to support communications in the packet switched domain—such as GPRS data transmissions.

From the description above, it will be understood that the coverage area of a mobile telecommunications network is divided into a plurality of cells, each of which is served by a respective base station. In order to allow a mobile terminal to maintain a call when the mobile terminal moves outside the coverage area of a cell, the call must be switched to an alternative cell automatically. The call must be routed to the new cell before handover can be effected whilst maintaining the connection with the old cell until the new connection is known to have succeeded. Handover is a time critical process requiring action to be taken before the radio link with the original cell degrades to such an extent that the call is lost. Handover requires synchronization of events between the mobile station and the network.

Handover between two cells served by the same MSC is relatively straightforward. The handover process is more complex when a mobile terminal moves between a first cell served by a first MSC and a second cell served by a second MSC. The VLRs of the MSCs and the HLR will additionally have to be updated to reflect that the mobile terminal is now in a cell served by the second MSC.

When a calling party (whether a subscriber within the mobile telecommunications network or outside it) attempts to call a mobile terminal within the network, that mobile terminal must be paged. Paging is a process of broadcasting a message which alerts a specific mobile terminal to take some action—in this example, to notify the terminal that there is an incoming call to be received. If the network knows in which cell the mobile terminal is located, it is only necessary to page in that cell. However, if the mobile terminal is moving within the network, the precise cell in which the mobile terminal is located may not be known. It will therefore be necessary to perform paging in a number of cells. The greater the number of cells in which paging must occur, the more use of valuable signaling capacity within the network.

However, if the HLR is to always have an up-to-date record of the cell in which each mobile terminal is located so that the current cell is occupied by a terminal is always know, this will require a large amount of location updating signaling between the mobile terminal and the HLR in order that the HLR has up-to-date records of the cells occupied by each mobile terminal. This is also wasteful of valuable signaling capacity.

As indicated above, the HLR is updated each time a mobile terminal moves from the coverage area of one MSC to another MSC and from one SGSN to another SGSN. However, typically the area covered by a single MSC and SGSN is large, and to page all the cells covered by a single MSC and SGSN would require a significant amount of paging signaling.

The problems of excessive use of signaling capacity by paging a multiplicity of cells or performing a multiplicity of frequent location updates is solved in a known manner by dividing the coverage area of the mobile telecommunications network into a plurality of location areas (LAs) and into a plurality of routing areas (RAs).

A location area relates to a particular geographical area for communications in the circuit-switched domain. Typically, although not necessarily, a location area is larger than the area of a single cell but is smaller than the area covered by one MSC. Each cell within the network broadcasts data indicative of the identity of its location area. The mobile terminal uses this data to determine when it moves into a new location area. The terminal stores its last known location area on its SIM. This information stored on the SIM is compared with the location area information broadcast by the local cell. The identities of the two location areas are compared. If they are different, the mobile terminal determines that it has entered a new location area. The mobile terminal then gains access to a radio channel and requests a location update. If the MSC/VLR is the same for the new and old location areas, the network can immediately authenticate the mobile terminal and note the change of location area. However, if the mobile terminal is moved to a different MSC/VLR, the MSC/VLR addresses a message to the HLR. The HLR notes the new location and downloads security parameters to allow the network to authenticate the mobile. It also passes on subscription details of the user to the new VLR and informs the old VLR to delete its records.

A routing area relates to a particular geographical area for communications in the packet-switched domain. Typically, although not necessarily, a routing area is larger than the area of a single cell but is smaller than the area covered by one SGSN. A routing area is typically, although not necessarily, smaller than a location area. There may be many routing areas within one location area. Each cell within the network broadcasts data indicative of its routing area (in addition to the data mentioned above indicative of the identity of its location area). The mobile terminal uses this received data to determine when it moves to a new routing area. The terminal stores the last known routing area on its SIM. The information stored on the SIM is compared with the routing area information broadcast by the local cell. The identities of the two routing areas are compared. If they are different, the mobile terminal determines that it has entered a new routing area. The mobile terminal then gains access to a radio channel and requests a routing area update.

GSM offers multiple "services" to end-users. In the GSM Specifications, services are grouped in 3 categories.

1. Bearer Services: A bearer service is used for transporting user data. Examples of bearer services are:
   Asynchronous and synchronous data, 300-9600 bps.
   Alternate speech and data, 300-9600 bps.
   Asynchronous PAD (packet-switched, packet assembler/disassembler) access, 300-9600 bps.
   Synchronous dedicated packet data access, 2400-9600 bps.

2. Tele-Services: These include both speech and data services. Examples of tele-services are:
   Telephony.
   Facsimile group 3.
   Emergency calls.
   Teletex.
   Short Message Services.
   Fax mail.
   Voice mail.

3. Supplementary Services: These are offered as improvements to the above tele-services. They enable the user to have better control of the basic services. Examples of supplementary services are:
Call Forwarding.
Call Barring.
Call hold. Puts an active call on hold.
Call Waiting.
Advice of Charge.
Multiparty service.
Calling Line Identification.

The foregoing is intended to be merely a simplified description of the normal operation of the GSM network. In practice, other procedures will be carried out. In particular, an authentication procedure will take place when a subscriber activates a mobile terminal using their SIM.

There have recently been proposals to allow access to the features and services provided by GSM networks other than by accessing those networks in the conventional manner by wireless signaling between the mobile terminal and the base station providing coverage in the cell occupied by the mobile terminal using GSM communication protocols. It has been proposed to provide network access points (APs), for example at a subscriber's home. A modified GSM terminal is provided with the facility to communicate with the access point by any suitable technology, for example by a Bluetooth® connection. A protocol for communication between such a mobile terminal and an access point has been developed and is called "unlicensed mobile access" (UMA), and allows GSM features to function using non-GSM bearer technologies.

Figure 2:
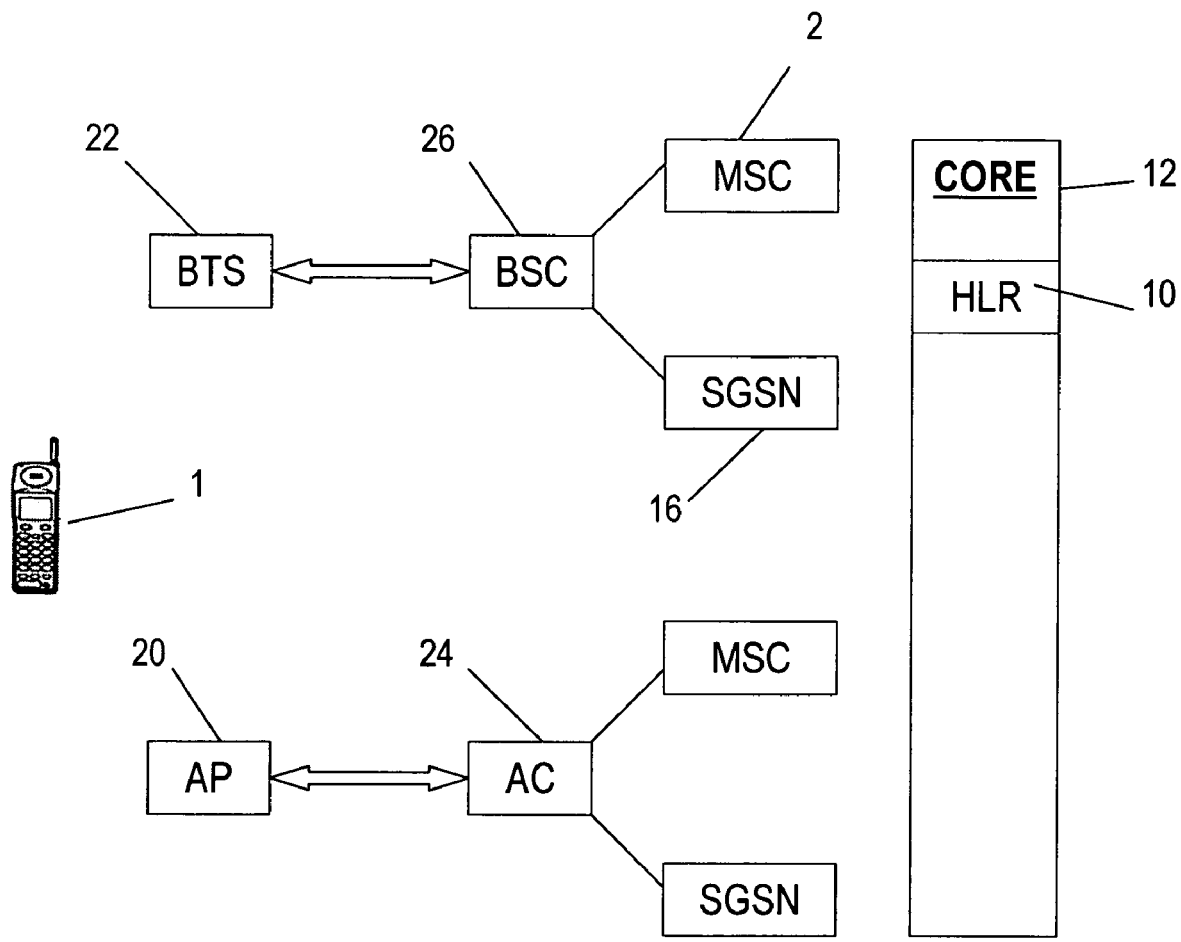
FIG. 2 shows a modified GSM mobile telephone network for receiving IP-based communications from a non-GSM access point.

FIG. 2 shows elements for providing access to a GSM network by both a conventional GSM bearer and a non-GSM bearer. As indicated above, an AP 20 provides a radio link to mobile terminal 1, although a link by a cable or other means such an infra-red is also possible. The AP 20 performs a role corresponding to that of a GSM base station transceiver (BTS) 22.

An access controller (AC) 24 is provided which performs a function analogous to that of a GSM BSC 26. Communications between the access point 20 and the access controller 24 are IP based communications, and may be, for example, transmitted over a broadband IP network (and routed via the Internet). The access controller 24 converts the IP based signaling received from the access point to use protocols used for signaling in conventional GSM networks between the base station controller 26 and MSC 2/SGSN 16.

It is desirable for the mobile telecommunications network to be able to determine whether communications received from the mobile terminal have been transmitted via the conventional BTS 22/BSC 26 route, or via the AP 20/AC 24 route. For example, different charges may be made depending upon the call routing.

At this point it should be appreciated that mobile telecommunications networks, with their geographically distributed BTSs, BSCs, MSCs and SGSNs, have been developed to allow subscribers to make and receive calls at any point, and whilst moving around, within the network coverage area. The complex location signaling between the mobile terminal and the components of the network is provided to enable this operation throughout the coverage area of the network. The considerations for fixed IP based communications are very different. Data received from the mobile terminal at the access point 20 is transmitted via any IP network (such as the Internet). Only a single access controller 24 is required to receive IP based communications from all access points 20. As indicated above, the functions of the BSC 26 and access controller 24 are analogous: both components translate communications into a format suitable for transmission to an MSC/SGSN. However, each BSC 26 is associated with a particular MSC 2 and SGSN 16 (and is located within a particular location area). In contrast, there is no particular predetermined relationship between the access controller 24 and any particular MSC/SGSN.

According to one aspect of the present invention, communications from a particular access point/mobile station are allocated to a selected location area/routing area and/or MSC/SGSN.

When a mobile terminal registers with an access point 20 after having been previously registered with the GSM network, the mobile terminal passes to the access controller 24 (via the access point 20) the Cell Global Identity (CGI) of the last cell used in the GSM network. The CGI is a concatenation of the location area identity and the cell identity and uniquely identifies a given location area, routing area and cell. The access controller 24 uses the CGI to select to which location area, routing area and/or MSC/SGSN communications received from the mobile terminal should be routed.

According to one embodiment of the invention an MSC is selected that is in the same location area as the MSC indicated by the CGI and/or an SGSN is selected that is in the same routing area as the SGSN indicated by the CGI. In order to provide an indication to the MSC/SGSN that communications received from the access controller have been routed via an IP network, rather than by the conventional route, the location area/routing area may be allocated a CGI value that is unused by the conventional GSM network. If this CGI value is selected by the access controller and communicated to the MSC/SGSN, the location area/routing area does not need to be changed but the MSC/SGSN can be configured to recognize that the CGI value is a special unused value, and can detect that communications are being routed via an IP network, rather than via the conventional GSM network.

An advantage of such an arrangement is that no location updating is required when a mobile terminal moves from conventional GSM coverage to coverage by a particular access point.

In some circumstances, it may be desirable to ensure that a location update does occur each time a mobile terminal moves between GSM coverage and coverage by a particular access point 20. In such a case, the access controller 24 can allocate an MSC/SGSN that is in a different location/routing area, thereby forcing the mobile telecommunications network to perform a location update.

Such arrangements are also advantageous because they allow communications received via geographically distributed access points to be distributed to MSCs/SGSNs throughout the mobile telecommunications network.

The term "GSM" used in this specification should be interpreted broadly. The invention is applicable to other telecommunications networks that are similar to GSM networks (in that they have equivalent nodes with equivalent functionality)—such as UMTS (3G), AMPS, D-AMPS, DCS 1800, 15-41, 15-54, 15-95, PCS, CDMA, TDMA networks. The invention is also applicable to developments or extensions to GSM—such as GPRS.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A cellular telecommunications network, comprising:
   a radio access network comprising a plurality of geographically distributed cells, each served by a base station; and
   a core network for providing cellular telecommunications network functions to devices registered therewith over a cellular telecommunications network bearer, wherein the devices provide to the radio access network an indicator of the identity of the cell occupied thereby, respective groups of said cells are allocated to respective location regions by the core network, and the core network maintaining a database of the location region occupied by each device,
   wherein the cellular communications network is adapted to provide core network cellular telecommunications network functions to devices registered therewith over a non-cellular telecommunications network bearer via another access network comprising a plurality of geographically distributed access points, each served by an access controller, and
   wherein, when a device switches from the radio access network to the other access network, the access controller of the other access network allocates a reserved cell identity indicator to the device, the reserved cell identity indicator being recognized by a switching center that routes communications received from the device as indicating no location updating is required for the device.

2. The cellular telecommunications network of claim 1, wherein said indicator of the identity of the cell occupied by the device includes the location region of that device.

3. The cellular telecommunications network of claim 1, wherein the radio access network comprises a plurality of base stations and the core network comprises a plurality of switching centers, each of said switching centers controlling a plurality of said base stations.

4. The cellular telecommunications network of claim 3, wherein each of said switching centers controls the cells of a plurality of said location regions.

5. The cellular telecommunications network of claim 3, wherein said switching centers comprise GSM Mobile Switching Centers.

6. The cellular telecommunications network of claim 3, wherein said switching centers comprise GSM Serving Gateway Support Nodes.

7. The cellular telecommunications network of claim 1, wherein said location regions comprise GSM Location Areas.

8. The cellular telecommunications network of claim 1, wherein said location regions comprise GSM Routing Areas.

9. The cellular telecommunications network of claim 1, wherein the non-cellular telecommunications network bearer includes a wireless link between the mobile terminal and an access point.

10. The cellular telecommunications network of claim 9, wherein said wireless link comprises one of: a Bluetooth link; or, a WLAN link.

11. The cellular telecommunications network of claim 9, wherein said wireless link comprises a link using unlicensed access technology.

12. The cellular telecommunications network of claim 1 wherein said non-cellular telecommunications network bearer comprises an IP-based communications link.

13. The cellular telecommunications network of claim 12, wherein said IP-based communications link includes the Internet.

14. The cellular telecommunications network of claim 1, wherein the access controller communicates the reserved cell identity indicator to the switching center.

15. The cellular telecommunications network of claim 1, wherein the access controller selects the switching center from a plurality of switching centers depending on the identity indicator of the cell in the radio access network then currently occupied by the network switching device and not on the reserved cell identity indicator allocated to the network switching device.

16. The cellular telecommunications network of claim 1, wherein the radio access network comprises a plurality of base station controllers and the core network comprises a plurality of switching centers, each of the base station controllers being configured to route communications through a particular switching center associated therewith in a predetermined relationship, whereas the access controllers of the other access network are configured to select any one of the switching centers to route communications through.

17. A method of operating a cellular telecommunications network that includes a radio access network including a plurality of geographically distributed cells each served by a base station, and a core network for providing cellular telecommunications network functions to devices registered therewith over a cellular telecommunications network bearer, the network further providing core network cellular telecommunications network functions to devices registered therewith over a non-cellular telecommunications network bearer via another access network comprising a plurality of geographically distributed access points, each served by an access controller, and the method comprising:
   allocating respective groups of cells to respective location regions;
   receiving from the devices an indicator of the identity of the cell occupied thereby;
   maintaining a database of the location region occupied by each device; and
   when a device switches from the radio access network to the other access network, at the access controller of the other access network allocating a reserved cell identity indicator to the device, the reserved cell identity indicator being recognized by a switching center that routes communications received from the device as indicating no location updating is required for the device.

18. The method of claim 17, wherein said indicator of the identity of the cell occupied by the device includes the location region of that device.

19. The method of claim 17, wherein the radio access network comprises a plurality of base stations and the core network comprises a plurality of switching centers, each of said switching centers controlling a plurality of said base stations.

20. The method of claim 19, wherein each of said switching centers controls the cells of a plurality of said location regions.

21. The method of claim 19, wherein said switching centers comprise GSM Mobile Switching Centers.

22. The method of claim 19, wherein said switching centers comprise GSM Serving Gateway Support Nodes.

23. The method of claim 17, wherein said location regions comprise GSM Location Areas.

24. The method of claim 17, wherein said location regions comprise GSM Routing Areas.

25. The method of claim 17, wherein the non-cellular telecommunications network bearer includes a wireless link between the mobile terminal and an access point.

26. The method of claim 25, wherein said wireless link comprises one of: a Bluetooth link; or, a WLAN link.

27. The method of claim 25, wherein said wireless link comprises a link using unlicensed access technology.

28. The method of claim 17, wherein said non-cellular telecommunications network bearer comprises an IP-based communications link.

29. The method of claim 28, wherein said IP-based communications link includes the Internet.

30. The method of claim 17, further comprising:
when the device switches networks, the access controller communicating the reserved cell identity indicator to the switching center.

31. The method of claim 17, further comprising:
when the device switches networks, the access controller selecting the switching center from a plurality of switching centers depending on the identity indicator of the cell in the radio access network then currently occupied by the network switching device and not on the reserved cell identity indicator allocated to the network switching device.

* * * * *